United States Patent
Uh et al.

(10) Patent No.: US 9,389,338 B2
(45) Date of Patent: Jul. 12, 2016

(54) OPTICAL MEMBER COMPRISING ANISOTROPIC CONDUCTIVE FILM

(75) Inventors: Dong Seon Uh, Uiwang-si (KR); Hyun Hee Namkung, Uiwang-si (KR); Kwang Jin Jung, Uiwang-si (KR); Jin Seong Park, Uiwang-si (KR); Jae Sun Han, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 243 days.

(21) Appl. No.: 13/273,498

(22) Filed: Oct. 14, 2011

(65) Prior Publication Data

US 2012/0141802 A1    Jun. 7, 2012

(30) Foreign Application Priority Data

Dec. 6, 2010   (KR) .................. 10-2010-0123809

(51) Int. Cl.
| | | |
|---|---|---|
| G02B 1/10 | (2015.01) | |
| C09J 9/02 | (2006.01) | |
| C09J 163/10 | (2006.01) | |
| C09J 175/14 | (2006.01) | |

(52) U.S. Cl.
CPC . G02B 1/105 (2013.01); C09J 9/02 (2013.01); C09J 163/10 (2013.01); C09J 175/14 (2013.01); Y10T 428/31504 (2015.04); Y10T 428/31511 (2015.04)

(58) Field of Classification Search
CPC ............ G02B 1/105; Y10T 428/31504; Y10T 428/31511; C09J 9/02; C09J 163/10; C09J 175/14

See application file for complete search history.

(56) References Cited

U.S. PATENT DOCUMENTS

| 8,247,697 B2 | 8/2012 | Ishimatsu | |
|---|---|---|---|
| 2002/0060092 A1* | 5/2002 | Kumakura | .................... 174/259 |
| 2003/0029559 A1* | 2/2003 | Yamada et al. | ............. 156/307.7 |
| 2003/0102466 A1* | 6/2003 | Kumakura et al. | ........... 252/511 |
| 2007/0166642 A1* | 7/2007 | Inoue | ........................ 430/270.1 |

FOREIGN PATENT DOCUMENTS

| CN | 1965267 | | 5/2007 |
|---|---|---|---|
| CN | 101689716 A | | 3/2010 |
| JP | 10030082 A | * | 2/1998 |
| JP | 2006124531 A | * | 5/2006 |
| JP | 2009-259787 | | 11/2009 |

OTHER PUBLICATIONS

Machine translation of JP 10030082 (2012).*
Machine translation of JP 2006124531 (2012).*
Korean Office Action dated Apr. 30, 2013 and Chinese Office Action dated Jun. 8, 2013.

* cited by examiner

*Primary Examiner* — Callie Shosho
*Assistant Examiner* — John Freeman
(74) *Attorney, Agent, or Firm* — Lee & Morse, P.C.

(57) ABSTRACT

An optical member includes an anisotropic conductive film that has a multilayer structure having a bonding layer containing an epoxy resin as a curing part and a bonding layer containing a (meth)acrylate resin as a curing part.

9 Claims, 3 Drawing Sheets

OPTICAL MEMBER COMPRISING ANISOTROPIC CONDUCTIVE FILM

BACKGROUND

1. Field

Embodiments relate to an optical member including an anisotropic conductive film. More particularly, embodiments relate to an optical member including an anisotropic conductive film that has a multilayer structure having a bonding layer containing an epoxy resin as a curing part and a bonding layer containing a (meth)acrylate resin as a curing part.

2. Description of the Related Art

With a recent trend toward large-scale and thin displays, a pitch between electrodes and circuits is becoming increasingly precise. An anisotropic conductive film may be used as a wiring material to connect fine circuit terminals.

SUMMARY

According to an embodiment, there is provided an optical member including an anisotropic conductive film formed of a multilayer structure including a bonding layer containing an epoxy resin as a curing part, and a bonding layer containing a (meth)acrylate resin as a curing part.

The multilayer structure may be a double layer.

The bonding layer containing the epoxy resin as the curing part may be attached to glass, and the bonding layer containing the (meth)acrylate resin as the curing part may be attached to a non-glass substrate or chip.

The bonding layer containing the epoxy resin as the curing part may include an epoxy resin not comprising (meth)acrylate, an epoxy (meth)acrylate, a latent curing agent, conductive particles, and a silane coupling agent.

The bonding layer containing the epoxy resin as the curing part may include, in terms of solid content, about 15 to about 59.9% by weight (wt %) of the epoxy resin, about 10 to about 30 wt % of the epoxy (meth)acrylate, about 29 to about 40 wt % of the latent curing agent, about 1 to about 10 wt % of the conductive particles, and about 0.1 to about 5 wt % of the silane coupling agent.

The epoxy resin may include a bisphenol epoxy resin and an aromatic epoxy resin.

The epoxy resin may include about 30 to about 80 wt % of the bisphenol epoxy resin and about 20 to about 70 wt % of the aromatic epoxy resin.

The bonding layer containing the (meth)acrylate resin as the curing part may include a urethane-modified acrylate resin, an epoxy (meth)acrylate, an isocyanurate (meth)acrylate, a (meth)acrylate group containing compound, a polymerization initiator, and conductive particles.

The bonding layer containing the (meth)acrylate resin as the curing part may include, in terms of solid content, about 25 to about 63 wt % of the urethane-modified acrylate resin, about 15 to about 30 wt % of the epoxy (meth)acrylate, about 15 to about 20 wt % of the isocyanurate (meth)acrylate, about 5 to about 15 wt % of the (meth)acrylate group containing compound, about 1 to about 10 wt % of the polymerization initiator, and about 1 to about 10 wt % of the conductive particles.

The bonding layer containing the (meth)acrylate resin as the curing part further may include a silane coupling agent.

According to an embodiment, there is provided an optical member including an anisotropic conductive film that has an adhesion decrease rate of more than 0 to about 30%, the adhesion decrease rate being represented by Equation 1:

Adhesion decrease rate (%)=$|(B-A)/A|\times 100$, [Equation 1]

where A represents adhesion after pressing at 160° C. and 3 MPa for 3 seconds, and B represents adhesion after pressing at 160° C. and 3 MPa for 3 seconds and storage at 85° C. and at 85 RH % for 250 hours.

According to an embodiment, there is provided an optical member including an anisotropic conductive film having an onset temperature of about 80 to about 90° C. and a peak temperature of about 95 to about 110° C. as measured using a differential scanning calorimetry.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
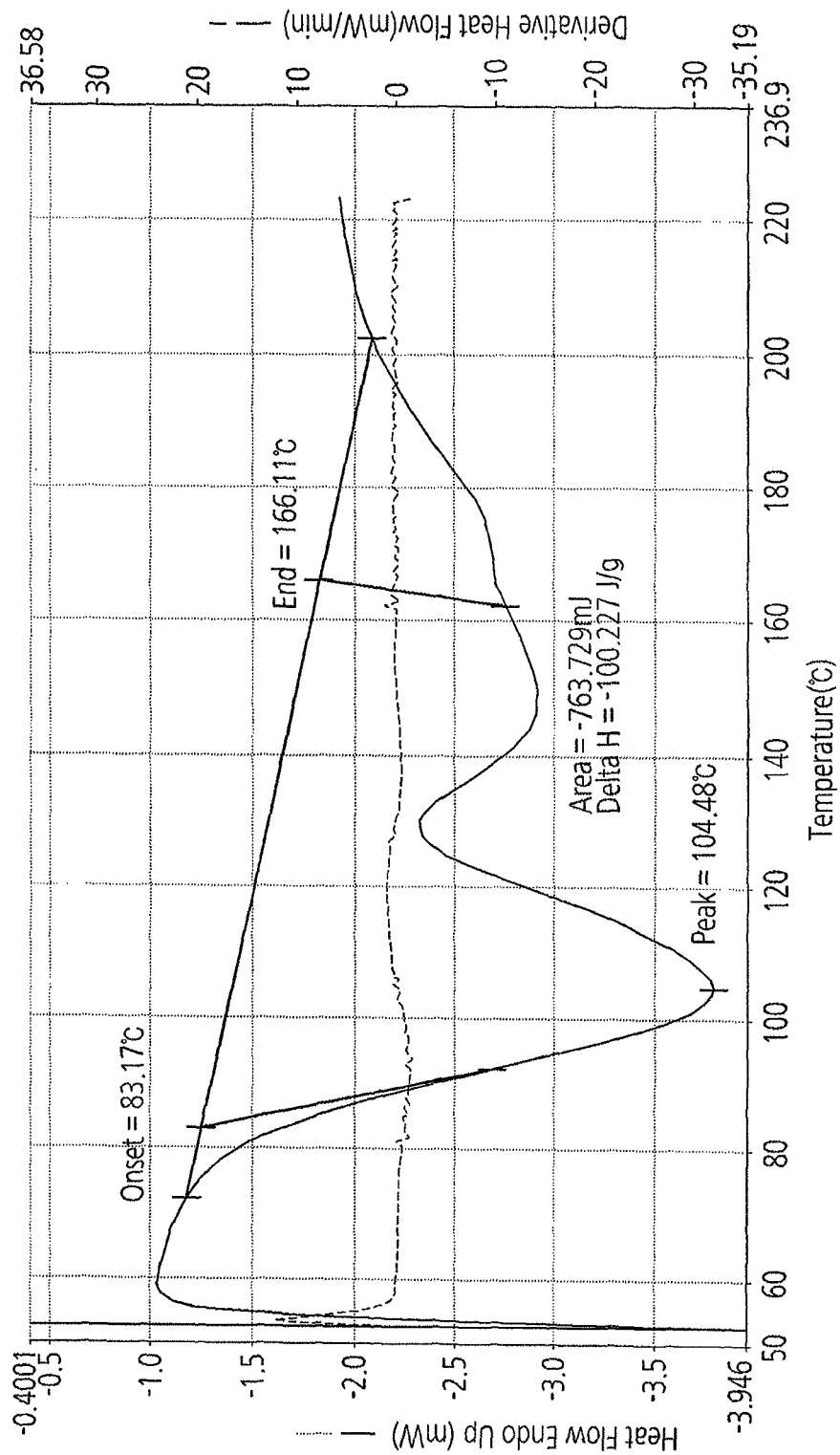
FIG. 1 illustrates results measured using a differential scanning calorimeter (DSC) on an anisotropic conductive film having a double layer structure including a bonding layer containing an epoxy resin as a curing part and a bonding layer containing a (meth)acrylate resin as a curing part according to an embodiment.

Korean Patent Application No. 10-2010-0123809, filed on Dec. 6, 2010, in the Korean Intellectual Property Office, and entitled: "Optical Member Comprising Anisotropic Conductive Film," is incorporated by reference herein in its entirety.

Example embodiments will now be described more fully hereinafter. However, embodiments may be embodied in different forms and should not be construed as limited to the embodiments set forth herein. Rather, the embodiments set forth herein are provided so that this disclosure will be thorough and complete, and will fully convey the scope of the invention to those skilled in the art.

According to an embodiment, an optical member includes an anisotropic conductive film having a multilayer structure formed of a bonding layer containing an epoxy resin as a curing part and a bonding layer containing a (meth)acrylate resin as a curing part.

Herein, the term "optical member" may refer to and include various display devices and semiconductor devices including a liquid crystal display (LCD) using an anisotropic conductive film for connecting modules.

The optical member may include an anisotropic conductive film that has an adhesion decrease rate of more than 0 to about 30% between adhesion after pressing at 160° C. and 3 MPa for 3 seconds and adhesion after pressing at 160° C. and 3 MPa for 3 seconds and storage at 85° C. and 85% relative humidity (RH %) for 250 hours and has an adhesion of 1,000 gf/cm or more after storage.

The adhesion decrease rate may be represented by Equation 1:

Adhesion decrease rate (%)=$|(B-A)/A|\times 100$, [Equation 1]

where A represents adhesion after pressing at 160° C. and 3 MPa for 3 seconds, and B represents adhesion after pressing at 160° C. and 3 MPa for 3 seconds and storage at 85° C. and at 85 RH % for 250 hours.

The adhesion decrease rate may be about 10 to about 30%.

Adhesion may be measured using any suitable method. For example, a compressed portion may be divided into about 10 mm pieces and a substrate or a chip may be bent at about 90°, followed by measurement of adhesion while elevating a load cell at a constant rate. In an implementation, a universal testing machine (H5KT, Hounsfield) may be used to measure adhesion at about 90°.

The anisotropic conductive film may have an adhesion of about 1,000 gf/cm, or more, preferably, about 1,100 to about 2,000 gf/cm after pressing at 160° C. and 3 MPa for 3 seconds. Then, after storage at 85° C. and 85 RH % for 250 hours, the anisotropic conductive film may have an adhesion of about 1,000 gf/cm or more, preferably about 1,100 to about 1,500 gf/cm.

The optical member may include an anisotropic conductive film having an onset temperature of about 80 to about 90° C. and a peak temperature of about 95 to about 110° C. as measured using DSC.

The anisotropic conductive film may be a multilayer film formed of a bonding layer containing an epoxy resin as a curing part and a bonding layer containing a (meth)acrylate resin as a curing part. The anisotropic conductive film may include at least two layers. The respective layers may be laminated into the multilayer film due to their intrinsic adhesion, for example. The multilayer film may have a double-layer structure with a thickness of about 5 to about 50 μm, for example.

In the double-layer structure, the bonding layer containing the epoxy resin as the curing part may be attached to glass, and the bonding layer containing the (meth)acrylate resin as the curing part may be attached to a non-glass substrate or a chip (FPCB or the like). Each layer in the double-layer structure may have a thickness of, for example, about 1 to about 30 μm.

The bonding layer containing the epoxy resin as the curing part may include an epoxy resin not comprising (meth)carylate, an epoxy (meth)acrylate, a latent curing agent, conductive particles, and a silane coupling agent. The bonding layer containing the (meth)acrylate resin as the curing part may include a urethane-modified acrylate resin, an epoxy (meth)acrylate, an isocyanurate (meth)acrylate, a (meth)acrylate group containing compound, a polymerization initiator, and conductive particles.

<Bonding Layer Containing Epoxy Resin as Curing Part>

Epoxy Resin

The epoxy resin may serve as a curing part securing adhesion and connection reliability and as a binder for forming a film.

The epoxy resin may include epoxy resin not comprising (meth)acrylate. Particularly, The epoxy resin may include, for example, at least one of bisphenol, novolac, glycidyl, aliphatic, cycloaliphatic, and aromatic epoxy resins.

In an implementation, the epoxy resin may include a mixture of a bisphenol epoxy resin and an aromatic epoxy resin. The bisphenol epoxy resin may include, for example, at least one of bisphenol A (BPA), bisphenol F, and catechol epoxy resins. The aromatic epoxy resin may include, for example, at least one of naphthalene, anthracene, and pyrene resins. The bisphenol epoxy resin may be present in an amount of about 30 to about 80 wt % in the epoxy resin, and the aromatic epoxy resin may be present in an amount of about 20 to about 70 wt % in the epoxy resin.

The epoxy resin may be present in an amount of about 15 to about 59.9 wt %, in terms of solid content, in the bonding layer containing the epoxy resin as the curing part. Within this range, physical bonding between a copper coating of an FPCB and a space may be obtained after curing, thereby ensuring excellent adhesion and connection reliability. In an implementation, the amount of epoxy resin may be about 25 to about 53.9 wt %.

Epoxy (Meth)Acrylate

The epoxy (meth)acrylate may impart compatibility to the bonding layer containing the epoxy resin as the curing part and the bonding layer containing the (meth)acrylate resin as the curing part, thereby improving compatibility between the layers.

The epoxy (meth)acrylate may include at least one of BPA epoxy (meth)acrylate, novolac epoxy (meth)acrylate, and di(meth)acrylate (of diglycidyl ether of propylene oxide modified BPA).

The epoxy (meth)acrylate may be present in an amount of about 10 to about 30 wt %, in terms of solid content, in the bonding layer containing the epoxy resin as the curing part. Within this range, compatibility between the bonding layer containing the epoxy resin as the curing part and the bonding layer containing the (meth)acrylate resin as the curing part may be improved, thereby minimizing separation of the two layers, which otherwise may occur upon heat curing. In an implementation, the amount of epoxy (meth)acrylate may be about 15 to about 30 wt %.

Latent Curing Agent

The latent curing agent is a heat curing agent for epoxy and may include any suitable heat curing agent for curing epoxy. Examples of the latent curing agent may include imidazoles, acid anhydrides, amines, hydrazides, cations, or the like, which may be used alone or as mixtures depending on purposes.

The latent curing agent may be present in an amount of about 29 to about 40 wt %, in terms of solid content, in the bonding layer containing the epoxy resin as the curing part. Within this range, the bonding layer may be thoroughly cured without leaving behind any uncured material. Thus, connection reliability and adhesion do not decrease and there is a possibility that effects of other additives than the curing agent may not occur. In an implementation, the amount of the latent curing agent may be about 30 to about 37 wt %.

Conductive Particles

The conductive particles may include any suitable conductive particles. In an implementation, the conductive particles may include metal particles including Au, Ag, Ni, Cu, solder, and the like; carbon particles; resin particles including polyethylene, polypropylene, polyester, polystyrene, polyvinyl alcohol, and the like, and modifications thereof, that are coated with metals including Au, Ag, Ni, and the like; and the metal-coated resin particles further coated with insulating particles. The conductive particles may have a size ranging from about 2 to about 50 μm depending on the pitch of an employed circuit and purposes.

The conductive particles may be present in an amount of about 1 to about 10 wt %, in terms of solid content, in the bonding layer containing the epoxy resin as the curing part. Within this range, insulation properties may be maintained and connection between circuits, which may be a function of the conductive particles, may be maintained. In an implementation, the amount of conductive particles may be about 1 to about 5 wt %.

Silane Coupling Agent

The silane coupling agent may include at least one of a polymerizable unsaturated group containing silicon compound, such as, for example, an unsaturated vinyltrimethoxysilane, vinyltriethoxysilane, (meth)acryloxypropyltrimethoxysilane, and the like; silicon compounds having an epoxy structure, such as 3-glycidoxypropyltrimethoxysilane, 3-glycidoxypropylmethyldimethoxysilane, 2-(3,4-epoxycyclohexyl)ethyltrimethoxysilane, and the like; amino group containing silicon compounds, such as 3-aminopropyltrimethoxysilane, N-2-(aminoethyl)-3-aminopropyltrimethoxysilane, N-(2-aminoethyl)-3-aminopropylmethyldimethoxysilane; and 3-chloropropyl trimethoxysilane.

The silane coupling agent may be present in an amount of about 0.1 to about 5 wt %, in terms of solid content, in the bonding layer containing the epoxy resin as the curing part. Within this range, wettability between glass panels may be improved, thereby enhancing adhesion. In an implementation, the amount of silane coupling agent may be about 0.1 to about 4 wt %.

<Bonding Layer Containing (Meth)Acrylate Resin as Curing Part>

Urethane-Modified Acrylate Resin

The urethane-modified acrylate resin, which is a binder of the bonding layer, may have low glass transition temperature, thereby improving flowability and exhibiting high adhesion due to presence of a urethane group in a molecular chain thereof. In particular, when the urethane-modified acrylate resin is used for the anisotropic conductive film, curing performance may be improved, thereby decreasing the temperature of a connecting process.

The urethane-modified acrylate resin may include, for example, diisocyanate, polyol, diol, and (meth)acrylate.

The diisocyanate may include one or more of aromatic, aliphatic, and alicyclic diisocyanates, and mixtures thereof. In an implementation, the diisocyanate may include at least one of tetramethylene-1,4-diisocyanate, hexamethylene-1,6-diisocyanate, cyclohexylene-1,4-diisocyanate, methylene bis (4-cyclohexyl diisocyanate), isophorone diisocyanate, 4,4-methylene bis(cyclohexyl diisocyanate), and a combination thereof.

The polyol may include one or more of a polyester polyol, a polyether polyol, a polycarbonate polyol, and the like, which have at least two hydroxyl groups in a molecular chain thereof. The polyester polyol may be obtained by condensation of a dicarboxylic acid compound and a diol compound. Examples of the dicarboxylic acid compound may include succinic acid, glutaric acid, isophthalic acid, adipic acid, suberic acid, azelaic acid, sebasic acid, dodecanedicarboxylic acid, hexahydrophthalic acid, terephthalic acid, ortho-phthalic acid, tetrachlorophthalic acid, 1,5-naphthalenedicarboxylic acid, fumaric acid, maleic acid, itaconic acid, citraconic acid, methaconic acid, and tetrahydrophthalic acid. Examples of the diol compound may include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, and 1,4-cyclohexanedimethanol. Examples of the polyether polyol may include polyethylene glycol, polypropylene glycol, and polytetraethylene glycol. The polyether polyol may have a weight average molecular weight of about 400 to about 10,000 g/mol, preferably about 400 to about 3,000 g/mol. Examples of the polycarbonate polyol may include polyalkylene carbonate and polycarbonate polyol derived from silicone.

In an implementation, the diol may include one or more of 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, and the like.

The (meth)acrylate may include a hydroxy (meth)acrylate or an amine (meth)acrylate.

The urethane-modified acrylate resin containing these four components may be prepared by polyaddition such that the mole ratio of diisocyanate group to hydroxyl group (OH) is about 1.04 to about 1.6 and the polyol content is about 70% or less among three components except for the acrylate. The polyaddition reaction may be followed by reaction of one terminal functional group of the urethane synthesized by polyaddition reaction, i.e., one diisocyanate group, with a hydroxyl acrylate or an amine acrylate in a mole ratio of about 0.1 to about 2.1. In addition, the remaining isocyanate groups may be subjected to reaction with alcohols, thereby producing the urethane-modified acrylate resin. Polyaddition may be carried out by any suitable method. Further, polyaddition may be conducted at a temperature of about 90° C. and a pressure of about 1 atm for about 5 hours using a tin-based catalyst, for example.

The urethane-modified acrylate resin may have a weight average molecular weight of about 1,000 to about 100,000 g/mol, preferably about 20,000 to about 100,000 g/mol, and more preferably about 20,000 to about 40,000 g/mol. The urethane-modified acrylate resin may have at least one terminal functional group of acrylate. Further, the urethane-modified acrylate resin may have two glass transition temperatures (Tg), at least one of which is about 0° C. or more.

The urethane-modified acrylate resin may have a single glass transition temperature of about 0° C. or more or at least one glass transition temperature of about 0° C. or more due to phase mixing of the polyol, which is a soft segment, and the diisocyanate, which is a hard segment. Thus, the urethane-modified resin may function as a binder forming a film at room temperature. Also, the urethane-modified acrylate resin may serve as a curing part by performing curing together with acryl of the curing part through the acrylate group present as the terminal functional group, thereby exhibiting excellent adhesion and high connection reliability.

The urethane-modified acrylate resin may be present in an amount of about 10 to about 50 parts by weight, in terms of solid content, with respect to 100 parts by weight of the double-layer structure including the bonding layer containing the (meth)acrylate resin as the curing part and the bonding layer containing the epoxy resin as the curing part. Within this range, a low glass transition temperature may be obtained to improve flowability. The anisotropic film may exhibit high adhesion due to presence of the urethane group in the molecular chain. For example, when the urethane-modified acrylate resin is used for the anisotropic conductive film, curing performance may be improved, thereby decreasing the temperature of a connecting process.

The urethane-modified acrylate resin may be present in an amount of about 25 to about 63 wt % based on the solid content in the bonding layer containing the (meth)acrylate resin as the curing part. Within this range, resin may be excluded between electrodes to prevent reduction in adhesion, and increase in connection reliability, which may occur as an excessive amount of resin is used, may be prevented. In an implementation, the amount of the urethane-modified acrylate resin may be about 40 to about 56 wt %.

Epoxy (Meth)Acrylate

The epoxy (meth)acrylate may impart compatibility to the bonding layer containing the (meth)acrylate resin as the curing part and the bonding layer containing the epoxy resin as the curing part, thereby improving compatibility between layers.

The epoxy (meth)acrylate may include at least one of BPA epoxy (meth)acrylate, novolac epoxy (meth)acrylate, and di(meth)acrylate (of diglycidyl ether of propylene oxide modified BPA).

The epoxy (meth)acrylate may be present in an amount of about 15 to about 30 wt %, in terms of solid content, in the bonding layer containing the (meth)acrylate resin as the curing part. Within this range, compatibility between the bonding layer containing the (meth)acrylate resin as the curing part and the bonding layer containing the epoxy resin as the curing part may be improved, thereby minimizing separation between the two layers. In an implementation, the amount of the epoxy (meth)acrylate may be about 18 to about 27 wt %.

Isocyanurate (Meth)Acrylate

The isocyanurate (meth)acrylate may exhibit high adhesion and connection reliability in low-temperature connection in a composition for the anisotropic conductive film. Examples of the isocyanurate (meth)acrylate may include ethylene oxide-modified isocyanuric acid di(meth)acrylate, tris(2-hydroxyethyl)isocyanurate tri(meth)acrylate, and the like. In an implementation, ethylene oxide-modified isocyanuric acid di(meth)acrylate may be used.

The isocyanurate (meth)acrylate may be present in an amount of about 15 to about 20 wt %, in terms of solid content, in the bonding layer containing the (meth)acrylate as the curing part. Within this range, proper connection reliability may be obtained and a decrease of adhesion may be avoided.

(Meth)Acrylate Group Containing Compound

The (meth)acrylate group containing compound may be a radical polymerizable compound and may be used as a curing component ensuring adhesion and connection reliability between connected layers when a radical curing reaction occurs.

The (meth)acrylate group containing compound may include one or more of a (meth)acrylate oligomer, a (meth)acrylate monomer, and the like. The (meth)acrylate oligomer may include any suitable (meth)acrylate oligomer, e.g., urethane (meth)acrylates, epoxy (meth)acrylates, polyester (meth)acrylates, fluorine (meth)acrylates, fluorene (meth)acrylates, silicone (meth)acrylates, phosphorus (meth)acrylates, maleimide modified (meth)acrylates, and acrylates (or methacrylates) that have a weight average molecular weight of about 1,000 to about 100,000 g/mol.

The urethane (meth)acrylates may have a middle structure of the molecule that are synthesized from, for example, one or more of a polyester polyol, a polyether polyol, a polycarbonate polyol, a polycaprolactone polyol, a tetrahydrofuran-propylene oxide ring-opening copolymer, polybutadiene diol, polydimethylsiloxane diol, ethylene glycol, propylene glycol, 1,4-butanediol, 1,5-pentanediol, 1,6-hexanediol, neopentyl glycol, 1,4-cyclohexane dimethanol, bisphenol A, hydrogenated bisphenol A, 2,4-toluene diisocyanate, 1,3-xylene diisocyanate, 1,4-xylene diisocyanate, 1,5-naphthalene diisocyanate, 1,6-hexane diisocyanate, isophorone diisocyanate, and bisphenol A propyleneoxide modified diacrylate. The epoxy (meth)acrylates may include middle structures of the molecule that include a backbone of, for example, one or more of 2-bromohydroquinone, resorcinol, catechol, bisphenols (bisphenol A, bisphenol F, bisphenol AD, bisphenol S, and the like), 4,4'-dihydroxybiphenyl, bis(4-hydroxyphenyl) ether, and (meth)acrylate oligomers composed of an alkyl, aryl, methylol, allyl, cycloaliphatic, halogen (tetrabromobisphenol A), nitro group, and the like. The (meth)acrylate oligomer may include compounds containing at least two maleimide groups, e.g., one or more of 1-methyl-2,4-bismaleimidebenzene, N,N'-m-phenylenebismaleimide, N,N'-p-phenylenebismaleimide, N,N'-m-toluoylene bismaleimide, N,N'-4,4-biphenylenebismaleimide, N,N'-4,4-(3,3'-dimethylbiphenylene)bismaleimide, N,N'-4,4-(3,3'-dimethyldiphenylmethane)bismaleimide, N,N'-4,4-(3,3'-diethyldiphenylmethane)bismaleimide, N,N'-4,4-diphenylmethanebismaleimide, N,N'-4,4-diphenylpropanebismaleimide, N,N'-4,4-diphenyl ether bismaleimide, N,N'-3,3'-diphenylsulfone bismaleimide, 2,2-bis[4-(4-maleimidophenoxy)phenyl]propane, 2,2-bis[3-s-butyl-4-8(4-maleimidophenoxy)phenyl]propane, 1,1-bis[4-(4-maleimidophenoxy)phenyl]decane, 4,4'-cyclohexylidene-bis[1-(4-maleimidophenoxy)-2-cyclohexyl]benzene, and 2,2-bis[4-(4-maleimidophenoxy)phenyl)hexafluoropropane.

In one embodiment, the (meth)acrylate oligomer may include one or more fluorene (meth)acrylate oligomers having a fluorene structure represented by Formula 1. Examples of the fluorene (meth)acrylate oligomers may include a fluorene epoxy (meth)acrylate oligomer, a fluorene urethane (meth)acrylate oligomer, and the like.

[Formula 1]

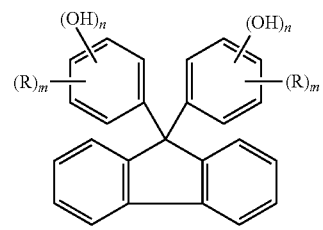

where R independently represents a C1 to C20 alkyl group, a C1 to C20 alkoxy group, a C6 to C20 aryl group, or a C6 to C20 cycloalkyl group, m independently represents an integer from 0 to 4, and n independently represents an integer from 2 to 5.

Use of the fluorene (meth)acrylate oligomers as the (meth)acrylate oligomer may minimize short circuits between circuits, and ensure low initial connection resistance and high reliability by superior insulation properties of the fluorene structure, thereby improving productivity and reliability of final products.

Further, the (meth)acrylate monomer may include any suitable (meth)acrylate monomer, e.g., 1,6-hexanediol mono (meth)acrylate, 2-hydroxyethyl(meth)acrylate, 2-hydroxypropyl(meth)acrylate, 2-hydroxybutyl(meth)acrylate, 2-hydroxy-3-phenyloxypropyl(meth)acrylate, 1,4-butanediol (meth)acrylate, 2-hydroxyalkyl (meth)acryloyl phosphate, 4-hydroxycyclohexyl(meth)acrylate, neopentylglycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerol di(meth)acrylate, t-hydrofurfuryl(meth)acrylate, isodecyl(meth)acrylate, 2-(2-ethoxyethoxy)ethyl (meth)acrylate, stearyl(meth)acrylate, lauryl(meth)acrylate, 2-phenoxyethyl(meth)acrylate, isobornyl(meth)acrylate, tridecyl(meth)acrylate, ethoxylated nonylphenol(meth)acrylate, ethyleneglycol di(meth)acrylate, diethyleneglycol di(meth)acrylate, triethyleneglycol di(meth)acrylate, t-ethyleneglycol di(meth)acrylate, polyethyleneglycol di(meth)acrylate, 1,3-butyleneglycol di(meth)acrylate, tripropyleneglycol di(meth)acrylate, ethoxylated bisphenol A di(meth)acrylate, cyclohexanedimethanol di(meth)acrylate, phenoxyt-glycol (meth)acrylate, 2-methacryloyloxyethyl phosphate, dimethylol tricyclodecane di(meth)acrylate, trimethylol-propanebenzoate acrylate, fluorene (meth)acrylate, and acid phosphoxyethyl methacrylate.

In addition, the (meth)acrylate monomer may include fluorene (meth)acrylate monomers having a fluorene structure represented by Formula 1. Examples of fluorene (meth)acrylate monomers may include a fluorene epoxy (meth)acrylate monomer and a fluorene urethane (meth)acrylate monomer. A commercially available example of a fluorene (meth)acrylate monomers may be BPEF-A (Osaka Gas Chemicals).

The (meth)acrylate group containing compound may be present in an amount of about 5 to about 15 wt %, in terms of solid content, in the bonding layer containing the (meth) acrylate resin as the curing part. Within this range, adhesion may not decrease even though pressing temperature increases, and uncuring may be prevented even though pressing temperature decreases, and thus connection reliability is secured. In an implementation, the amount of the (meth) acrylate group may be about 7 to about 12 wt %.

Polymerization Initiator

The polymerization initiator may serve as a curing agent generating free radicals when heated or exposed to light. Examples of the polymerization initiator may include lauroylperoxide, t-butylperoxylaurate, 1,1,3,3-t-methylbutyl peroxy-2-ethylhexanonate, 2,5-dimethyl-2,5-di(2-ethylhexanoyl peroxy)hexane, 1-cyclohexyl-1-methylethyl peroxy-2-ethylhexanonate, 2,5-dimethyl-2,5-di(m-toluoylperoxy)hexane, t-butyl peroxyisopropylmonocarbonate, t-butyl peroxy-2-ethylhexylmonocarbonate, t-hexyl peroxybenzoate, t-butyl peroxyacetate, dicumyl peroxide, 2,5-dimethyl-2,5-di(t-butylperoxy)hexane, t-butylcumylperoxide, t-hexyl peroxyneodecanoate, t-hexylperoxy-2-ethylhexanonate, t-butylperoxy-2-2-ethylhexanonate, t-butylperoxyisobutyrate, 1,1-bis(t-butylperoxy)cyclohexane, t-hexyl peroxyisopropylmonocarbonate, t-butylperoxy-3,5,5-trimethylhexanonate, t-butylperoxypivalate, cumylperoxy-neodecanoate, diisopropylbenzenehydroperoxide, cumene hydroperoxide, isobutylperoxide, 2,4-dichlorobenzoylperoxide, 3,5,5-trimethylhexanoylperoxide, octanoylperoxide, stearoylperoxide, succinic peroxide, benzoylperoxide, 3,5,5-trimethylhexanoylperoxide, benzoylperoxytoluene, 1,1,3,3-tetramethylbutylperoxyneodecanoate, 1-cyclohexyl-1-methylethylperoxyneodecanoate, di-n-propylperoxydicarbonate, diiso-propylperoxycarbonate, bis(4-t-butylcyclohexyl) peroxydicarbonate, di-2-ethoxymethoxyperoxydicarbonate, di(2-ethylhexylperoxy) dicarbonate, dimethoxy-butylperoxydicarbonate, di(3-methyl-3-methoxybutylperoxy) dicarbonate, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-(t-butylperoxy)cyclododecane, 2,2-bis(t-butylperoxy)decane, t-butyltrimethylsilyl peroxide, bis(t-butyl)dimethylsilylperoxide, t-butyltriallylsilylperoxide, bis(t-butyl)diallylsilylperoxide, and tris(t-butyl) allylsilylperoxide.

As the polymerization initiator, a compound having a half-life of about 5 hours to about 15 hours at a temperature of about 40 to about 100° C. may used. When the half-life of the polymerization initiator is too low, its decomposition rate may be fast, causing difficulties in storage at room temperature. When the half-life is excessively high, a polymerization rate may become too slow, which may not be proper for quick curing.

The polymerization initiator may be present in an amount of about 1 to about 10 wt %, in terms of solid content, in the bonding layer containing the (meth)acrylate resin as the curing part. Within this range, the curing reaction rate may not be reduced. Accordingly, final pressing characteristics may not be deteriorated. Further, breaking properties of the anisotropic conductive film may not increase after curing the film by heating, and thus a problem that the anisotropic conductive film is not thoroughly removed may not occur in rework. In an implementation, the amount of polymerization initiator may be about 1 to about 5 wt %.

Conductive Particles

The conductive particles may be the same as the conductive particles of the bonding layer containing the epoxy resin as the curing part. The conductive particles may be present in an amount of about 1 to about 10 wt %, in terms of solid content, in the bonding layer containing the (meth)acrylate resin as the curing part. Within this range, a connection failure or insulation failure due to a decrease in connection area as terminals are misaligned in a connecting process may be avoided. In an implementation, the amount of conductive particles may be about 2 to about 5 wt %.

The bonding layer containing the (meth)acrylate resin as the curing part may further include a silane coupling agent in addition to the urethane-modified acrylate resin, the epoxy (meth)acrylate, the isocyanurate (meth)acrylate, the (meth) acrylate group containing compound, the polymerization initiator, and the conductive particles.

The silane coupling agent may be the same as the silane coupling agent of the bonding layer containing the epoxy resin as the curing part. The silane coupling agent may be present in an amount of about 1 to about 5 wt % based on the solid content of the bonding layer containing the (meth)acrylate resin as the curing part, preferably about 2 to about 5 wt %.

The following Examples and Comparative Examples are provided in order to set forth particular details of one or more embodiments. However, it is to be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. Details that are not included herein will be readily recognized and appreciated by those skilled in the art, and an explanation thereof is thus omitted.

A description of details apparent to those skilled in the art will be omitted herein.

EXAMPLES

Preparation Example

Preparation of Urethane-Modified Acrylate Resin

Using 50 vol % methyl ethyl ketone as a solvent and at a polyol content of 60% and a mole ratio of hydroxy acrylate/ isocyanate of 1, polyurethane acrylate (weight average molecular weight: 28,000 g/mol) was synthesized by polyaddition at 90° C. and 1 atm for 5 hours using dibutyltin dilaurate as a catalyst.

Example 1

Preparation of Anisotropic Conductive Film (1) Bonding Layer Containing (Meth)Acrylate Resin as Curing Part 46.5 wt % of the urethane-modified acrylate resin prepared in the Preparation Example, 19.2 wt % of epoxy (meth)acrylate (BPA epoxy acrylate), 18.2 wt % of ethylene oxide-modified isocyanuric acid diacrylate (DSC caloric value: 92° C., heating peak: 95° C., high reaction rate), 10.1 wt % of bisphenol A propylene oxide-modified diacrylate (weight average molecular weight: 1,000 g/mol), 2.0 wt % of lauroylperoxide, and 4.0 wt % of conductive balls (average particle size (D50): 5 μm) were mixed, thereby producing a composition for a bonding layer containing a (meth)acrylate resin as a curing part. This composition was deposited to a thickness of 25 μm on a release film and dried at 70° C., thereby producing a film.

(2) Bonding Layer Containing Epoxy Resin as Curing Part 27.7 wt % of a bisphenol A epoxy resin (YD128, Kukdo Chemical), 11.9 wt % of a naphthalene epoxy resin (HP4032D, Dainippon Ink and Chemicals), 19.8 wt % of epoxy (meth)acrylate (BPA epoxy acrylate), 35.6 wt % of an imidazole curing agent (HX3922HP, microcapsule type, Asahi Kasei), 3.0 wt % of nickel powder (average particle size (D50): 6 μm), and 2.0 wt % of 3-glycidoxypropyltrimethoxysilane (KBM403, Shin-Etsu) as a silane coupling agent were mixed, thereby producing a composition for a bonding layer containing an epoxy resin as a curing part. This composition was deposited to a thickness of 25 μm on a release film and dried at 70° C., thereby producing a film.

(3) Anisotropic Conductive Film

The bonding layer containing the (meth)acrylate resin as the curing part and the bonding layer containing the epoxy resin as the curing part were laminated to form an anisotropic conductive film having a two layer structure.

Example 2

An anisotropic conductive film was prepared in the same manner as in Example 1 except that components included in the bonding layer containing the (meth)acrylate resin as the curing part and the bonding layer containing the epoxy resin as the curing part were used according to compositions listed in Table 1.

Comparative Examples 1 and 2

Anisotropic conductive films were prepared in the same manner as in Example 1 except that components included in the bonding layer containing the (meth)acrylate resin as the curing part and the bonding layer containing the epoxy resin as the curing part were used according to compositions listed in Table 1.

TABLE 1

(Content: wt %)

| | | Example | | Comparative Example | |
|---|---|---|---|---|---|
| | | 1 | 2 | 1 | 2 |
| Bonding layer containing (meth)acrylate resin as curing part | Urethane-modified acrylate resin | 46.5 | 44.1 | — | 50 |
| | Epoxy (meth)acrylate | 19.2 | 26.4 | — | 15 |
| | Isocyanurate (meth)acrylate | 18.2 | 15.4 | — | 15 |
| | (Meth)acrylate group containing compound | 10.1 | 8.8 | — | 12 |
| | Polymerization initiator | 2.0 | 2.0 | — | 3 |
| | Conductive particles | 4.0 | 3.3 | — | 5 |
| Bonding layer containing epoxy resin as curing part | Epoxy resin | Epoxy resin 1 | 27.7 | 14.6 | 25 | — |
| | | Epoxy resin 2 | 11.9 | 22 | 15 | — |
| | Epoxy (meth)acrylate | 19.8 | 27.5 | 20 | — |
| | Latent curing agent | 35.6 | 33 | 35 | — |
| | Conductive particles | 3.0 | 2.7 | 3 | — |
| | Silane coupling agent | 2.0 | 0.2 | 2 | — |

* Epoxy resin 1: Bisphenol epoxy resin
Epoxy resin 2: Naphthalene epoxy resin
Content (wt %): Components in the bonding layer containing the (meth)acrylate resin as the curing part and the bonding layer containing the epoxy resin as the curing part are represented in wt %.

Experimental Example

Measurement DSC Temperature (1) Connection Reliability

Each anisotropic conductive film was placed on a circuit forming part of a glass panel and subjected to preliminary pressing at 80° C. and 1 MPa for 1 second. After eliminating the release film, the anisotropic conductive film was placed on an FPCB terminal and subjected to final pressing at 160° C. and 3 MPa for 3 seconds. The product was evaluated as to initial contact resistance using a 2 point probe method and as to 90° adhesion using a universal testing machine (H5KT, Hounsfield). Also, occurrence of bubbles between terminals was identified using a microscope. A product that had bubbles formed at less than 0 to 5% per area in the pressed portion is indicated by 0, a product that had bubbles formed at 5 to 50% per area in the pressed portion is indicated by Δ, and a product that had bubbles formed at more than 50% per area in the pressed portion is indicated by X.

To evaluate reliability, after the product was left at a constant temperature/constant humidity of 85° C./85 RH % for 250 hours, contact resistance, adhesion, and occurrence of bubbles were evaluated in the same manner. Results are illustrated in Table 2.

(2) DSC Temperature

Figure 2:
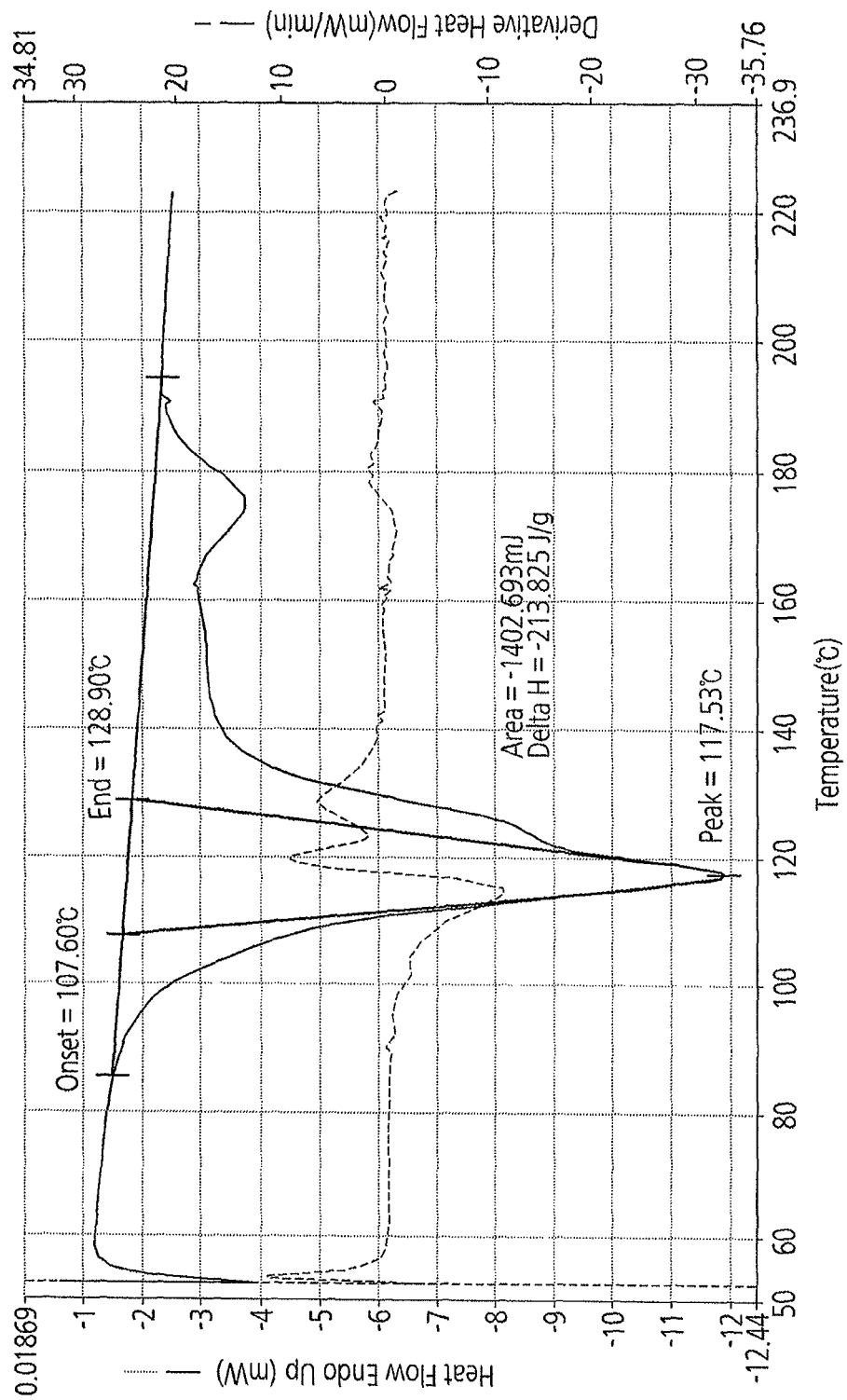
FIG. 2 illustrates results measured by DSC on an anisotropic conductive film including a bonding layer containing an epoxy resin as a curing part only.
Figure 3:
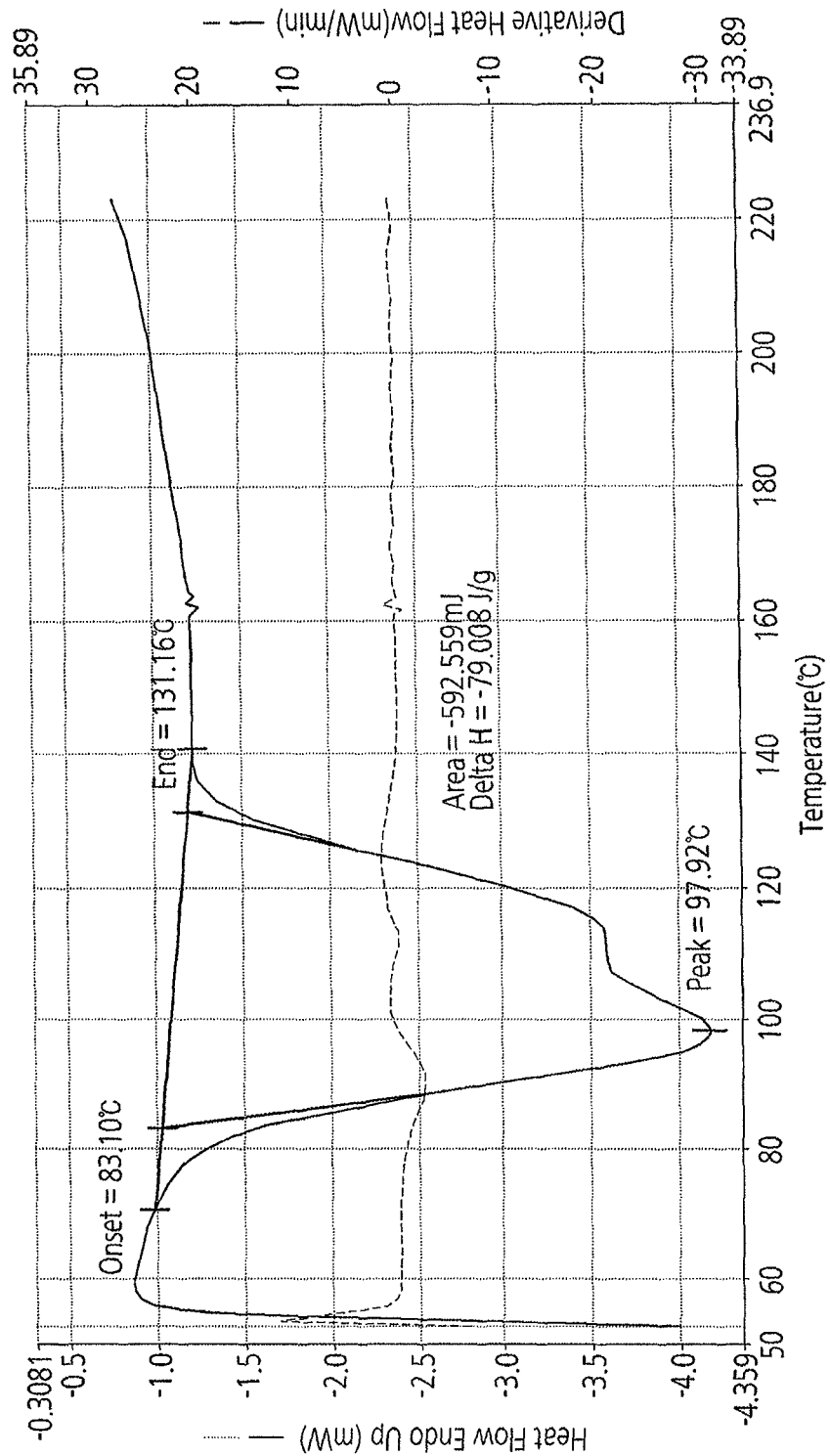
FIG. 3 illustrates results measured by DSC on an anisotropic conductive film including a bonding layer containing a (meth)acrylate resin as a curing part only.

The onset temperature and peak temperature of each anisotropic conductive film were measured using a DSC, and results are illustrated in Table 2 and FIGS. 1 to 3.

TABLE 2

| | | | Example | | Comparative Example | |
|---|---|---|---|---|---|---|
| | | | 1 | 2 | 1 | 2 |
| Connection reliability | Initial | Contact resistance (Ω) | 1.2 | 1.3 | 1.5 | 1.4 |
| | | Adhesion (gf/cm) | 1700 | 1600 | 1000 | 1800 |
| | | Bubbles | ○ | ○ | Δ | ○ |
| | After storage at constant temperature/ humidity of 85° C./80% for 250 hours | Contact resistance (Ω) | 1.5 | 1.4 | 4 | 2.5 |
| | | Adhesion (gf/cm) | 1200 | 1300 | 500 | 900 |
| | | Bubbles | ○ | ○ | X | Δ |
| DSC temperature | Onset (° C.) | | 83.17 | 83.20 | 107.60 | 83.10 |
| | Peak (° C.) | | 104.48 | 105.81 | 117.53 | 97.92 |

As shown in Table 2, the anisotropic conductive films according to the Examples enable low-temperature quick curing and have high connection reliability.

The anisotropic conductive films used for the optical member according to the Examples have an initial adhesion of 1,000 gf/cm or more, and the adhesion of each is maintained at 1,000 gf/cm or more after storage at 85° C./85 RH % for 250 hours. Therefore, the anisotropic conductive films according to Examples exhibit a considerably lower decrease in adhesion as compared with the anisotropic conductive film including the bonding layer containing only the (meth)acrylate resin as the curing part or including only the bonding layer containing the epoxy resin as the curing part only. In addition, the anisotropic conductive films according to Examples have an initial contact resistance of 2.5Ω or less, and the contact resistance of each is maintained at 2Ω or less, which shows that connection reliability is high. Moreover, as illustrated by the DSC onset temperature and peak temperature, the anisotropic conductive films according to Examples enable low-temperature quick curing similar to the anisotropic conductive film including only the bonding layer containing the (meth)acrylate resin as the curing part.

By way of summation and review, connection reliability is desirable for an anisotropic conductive film to be used for a bonding material. As to contact resistance, adhesion and the like, contact resistance of a typical anisotropic film measured in the initial state may be increased or adhesion thereof may be reduced depending on storage conditions of the film, thereby deteriorating connection reliability. Further, bubbles may be generated in terminals while the film is used, which also causes decrease in connection reliability. In addition, the typical anisotropic conductive film may be cured at 160° C. or more, and thus a great amount of time may be involved in heating and pressing.

Therefore, an anisotropic conductive film that has connection reliability and enables reduction in pressing time by low-temperature quick curing is desirable.

The present embodiments advance the art by providing an optical member including an anisotropic conductive film that includes a multilayer structure formed of a bonding layer containing an epoxy resin as a curing part and of a bonding layer containing a (meth)acrylate resin as a curing part. With such embodiments, process time may be reduced and low-temperature pressing may be used such that deformation in a panel may be minimized. Moreover, connection reliability in terms of contact resistance and adhesion may be improved.

Although some embodiments have been disclosed herein, it should be understood by those skilled in the art that these embodiments are provided by way of illustration only, and that various modifications, changes, and alterations can be made without departing from the spirit and scope of the invention. Therefore, the scope of the invention should be limited only by the accompanying claims and equivalents thereof.

What is claimed is:

1. An optical member, comprising:
    an anisotropic conductive film that has an adhesion decrease rate of more than 0 to about 30%, the adhesion decrease rate being represented by Equation 1:

$$\text{Adhesion decrease rate (\%)} = |(B-A)/A| \times 100, \quad \text{[Equation 1]}$$

where A represents adhesion after pressing at 160° C. and 3 MPa for 3 seconds, and B represents adhesion after pressing at 160° C. and 3 MPa for 3 seconds and storage at 85° C. and at 85 RH % for 250 hours,
    wherein:
    the anisotropic conductive film includes a double-layer structure formed of: a first bonding layer containing an epoxy resin as a curing part and an epoxy (meth)acrylate, and a second bonding layer containing a (meth)acrylate resin as a curing part and an epoxy (meth)acrylate, wherein the first bonding layer is attached to glass, and the second bonding layer is attached to a non-glass substrate or chip,
    the anisotropic conductive film has an onset temperature of about 80 to about 90° C. and a peak temperature of about 95 to about 110° C. as measured using a differential scanning calorimetry, and
    the second bonding layer includes, in terms of solid content:
        about 25 to about 63 wt % of a urethane-modified acrylate resin,
        about 15 to about 30 wt % of an epoxy (meth)acrylate,
        15 to about 20 wt % of an isocyanurate (meth)acrylate,
        about 5 to 12 wt % of a (meth)acrylate group containing compound,
        about 1 to about 10 wt % of a polymerization initiator, and
        about 1 to about 10 wt % of conductive particles.

2. The optical member as claimed in claim 1, wherein the first bonding layer includes:
    an epoxy resin not comprising (meth)acrylate,
    the epoxy (meth)acrylate,
    a latent curing agent,
    conductive particles, and
    a silane coupling agent.

3. The optical member as claimed in claim 2, wherein the first bonding layer includes, in terms of solid content:
    about 15 to about 59.9% by weight (wt %) of the epoxy resin,
    about 10 to about 30 wt % of the epoxy (meth)acrylate,
    about 29 to about 40 wt % of the latent curing agent,
    about 1 to about 10 wt % of the conductive particles, and
    about 0.1 to about 5 wt % of the silane coupling agent.

4. The optical member as claimed in claim 2, wherein the epoxy resin includes a bisphenol epoxy resin and an aromatic epoxy resin.

5. The optical member as claimed in claim 4, wherein the epoxy resin includes about 30 to about 80 wt % of the bisphenol epoxy resin and about 20 to about 70 wt % of the aromatic epoxy resin.

6. The optical member as claimed in claim 1, wherein the second bonding layer further includes a silane coupling agent.

7. The optical member as claimed in claim 1, wherein the double-layer structure has a thickness of about 5 to about 50 μm, and each of the first and second bonding layers has a thickness of about 1 to about 30 μm.

8. The optical member as claimed in claim 1, wherein at least one of the epoxy (meth)acrylates includes BPA epoxy (meth)acrylate, novolac epoxy (meth)acrylate, or di(meth)acrylate of diglycidyl ether of propylene oxide modified BPA.

9. The optical member as claimed in claim 1, wherein at least one of the epoxy (meth)acrylates includes di(meth)acrylate of diglycidyl ether of propylene oxide modified BPA.

* * * * *